United States Patent Office 3,660,447
Patented May 2, 1972

---

3,660,447
PROCESS OF OXIDIZING ALUMINUM ALKYLS
Hoyt J. Cragg and Doyle A. Nolen, Baton Rouge, La., assignors to Ethyl Corporation, New York, N.Y.
No Drawing. Filed July 18, 1969, Ser. No. 843,206
Int. Cl. C07f 5/06
U.S. Cl. 260—448 AD          12 Claims

ABSTRACT OF THE DISCLOSURE

Titanium tetrachloride and certain related materials are disclosed as being useful adjuvants for the oxidation of alkyl aluminum alkoxide materials to produce trialkoxy aluminum compounds.

BACKGROUND OF THE INVENTION

Field of the invention

This invention relates to the oxidation of alkyl groups of aluminum alkyl compounds to produce trialkoxy aluminum compounds. In particular, the invention relates to oxidations wherein trialkyl aluminum compounds are converted to trialkoxy aluminum compounds. In even greater particularity, the invention is directed to carrying out the terminal portion of the oxidation, particularly the conversion from dialkoxy alkyl aluminum compounds to corresponding trialkoxy aluminum compounds. The principal improvement of the invention is with respect to the use of adjuvant or catalytic compounds in the process and under preferred conditions to improve the conversion to alkoxides.

Description of the prior art

The oxidation of aluminum alkyls to produce aluminum alkoxides is a process that has been known for some time. It was described by Ziegler in U.S. Pat. 2,892,858 as taking place in a stepwise manner of conversion of first one alkyl group per aluminum atom, then of a second alkyl group and finally of the third alkyl group. Ziegler describes the last step as being particularly difficult, requiring a lengthy re-oxidation at ordinary or slightly increased temperatures. Temperatures of $-20$ to $+150°$ C. are discussed broadly with 30 to 60° C. being preferred.

The aluminum trialkoxides produced by the oxidation are advantageously converted to valuable product alcohol by hydrolysis.

It is characteristic of the foregoing oxidation that numerous by-product materials are produced which result in reduced yields of the valuable alcohol products. U.S. Pat. 3,394,195 discusses the magnitude of the problem and typical procedures usable to separate certain by-products and recover same value from them.

British Pat. 993,666, which releates to cadmium and zinc materials indicates the magnitude of losses to by-products and otherwise. In that patent it is pointed out that the maximum conversion of alkyl to alkoxy radicals (or to alcohol) by an ordinary Ziegler oxidation (and subsequent hydrolysis) is about 75 percent, the remaining 25 percent being wasted. The patent seeks to improve this but unfortunately there are many areas wherein it is undesired to have product alcohols that have a prior history of contact with zinc and cadmium materials. Actually the loss and conversion figures of this patent tend to suggest that, while the Ziegler oxidation may convert substantially all alkyl groups, it does not produce much more than two alkoxy groups per atom of aluminum.

Another characteristic of the Ziegler oxidation is the production of a certain class of by-products of a difunctional nature that give problems in certain utilizations of product alcohols. The problem is so great that special procedures have been devised for its alleviation. This is discussed in U.S. Pat. 3,468,965.

It has been found that the oxidation can be improved materially with respect to minimizing the formation of oxidation by-products, even the difunctional by-products, and improving yields of aluminum trialkoxides by charging titanium tetrachloride to the system. It is not known whether the catalyst remains in that form in the oxidation but it is known that the catalysis works. Group IV–B bromides and iodides are also useful but the chlorides are preferred. The metal groupings are those of the 1955 Chart of Fisher Scientific Company and include titanium, zirconium and hafnium in descending order of preference for the present purposes.

Another patent that may be considered to be of interest in the area is Belgian Pat. 553,721 which is related to abandoned U.S. application S.N. 555,273 (filed Dec. 27, 1955). It is important to recognize that this prior art relates primarily to the processing of halo aluminum alkyl materials wherein titanium tetrachloride is used as a catalyst for the chain growth of halo aluminum alkyl materials. The additive may be permitted to remain in the system when the grown dialkyl aluminum mono halide material is oxidized to a dialkoxy aluminum mono halide. One important point here is that the materials never experience the difficult third (theoretical) step of Ziegler's conversion of dialkoxy aluminum mono alkyl to trialkoxy aluminum.

Another patent of interest is British Pat. 1,019,968 wherein compounds of iron, nickel or cobalt are used in connection with catalyzing the addition of non-alpha olefins to aluminum alkyl materials. Apparently the product is oxidized and hydrolyzed for analysis purposes.

Another patent of interest is British Pat. 1,006,843 which relates to isomerization of secondary alkyl aluminum compounds using various compounds of Group IV–B, V–B, VI–B, VII–B and VIII elements.

Two other patents of interest are U.S. 3,070,616 (S.N. 18,834 of Mar. 31, 1960) and British Pat. 932,501 (U.S. Ser. No. 18,836 of Mar. 31, 1960). These patents appear to seek to teach improved oxidative conversion of dialkoxy alkyl aluminums to trialkoxy aluminums using added trialkoxy aluminums.

Many of the foregoing patents are cited to emphasize that various materials have been used in connection with numerous different reactions of numerous different aluminum materials. Oxidation may be used as an analysis tool in some instances.

An important related teaching is U.S. 3,475,476. There it is taught that titanium isopropoxide and related materials are useful catalysts in the oxidation of aluminum alkyl materials.

SUMMARY OF THE INVENTION

An object of the present invention is to provide inexpensive catalysts for the oxidation of aluminum alkyl materials to produce aluminum trialkoxides in high yield.

Another object of the present invention is to provide a catalysis for the oxidation of dialkoxy alkyl aluminums to produce trialkoxy aluminums. Strictly speaking, this object is with respect to a subsequent step in a plural step oxidation sequence where one begins with trialkyl aluminums.

Another object of the present invention is to provide an improved oxidation process for aluminum alkyl materials wherein a halide of a Group IV–B element is charged to the system for the oxidation operation per se.

Another object of the present invention is to provide a catalyzed oxidation process as in the foregoing objects wherein the metal halide is a chlorine, bromine, or iodine compound of titanium, zirconium or hafnium.

Another object of the present invention is to provide a catalyzed oxidation process as in the foregoing objects wherein the metal halide is titanium tetrachloride. Titanium tetrachloride has important advantages with respect to cost and ease of handling.

Another object is to provide an oxidation process as in the foregoing objects wherein the oxidation is preferably conducted at a temperature from about 35° C. to about 85° C. A more preferred temperature range is 40 to 70° C. with 55° C. being a particularly desirable temperature.

Other and further objects and features of the present invention will become apparent upon careful consideration of the following discussion.

In accordance with the principles of the present invention, a catalytic process is provided for the oxidation of aluminum alkyl materials to produce aluminum trialkoxides. In particular, the catalysis is of greatest effect for minimizing the formation of by-product materials in the oxidative conversion of dialkoxy alkyl aluminum compounds to produce trialkoxy aluminum compounds.

To a lesser but significant extent the invention is useful during the conversion of mono alkoxy dialkyl aluminum compounds to produce dialkoxy alkyl aluminum compounds.

The present invention is of comparatively little value when the catalytic materials are added at the trialkyl state of the material to be oxidized; viz., in the conversion of trialkyl aluminums to mono alkoxy alkyl aluminums. As a matter of fact, there are indications that the titanium is reduced to an inactive state by $AlR_3$. Frequently one preferably conducts this "first" step under the Ziegler conditions in the absence of the present catalysts. In practice, one conducts the non-catalyzed oxidation to a level of about 30 to about 70 percent alkoxy groups, then adds the catalyst and proceeds under the conditions recited herein to substantially complete termination of oxidation take-up. Addition at the 30 percent level is usually preferred and the peak effectiveness seems to manifest itself after about the 57 to 58 percent level of alkoxy group content is reached.

The present invention is useful when handling aluminum compounds wherein the individual alkyl groups (R—) and the alkoxide groups (RO—) have carbon skeleton chains containing from about 2 to about 50 carbon atoms. A preferred narrower range is from about 2 to about 24 carbon atoms. A more preferred narrower range is from about 2 to about 20 carbon atoms per R— and RO— group. An even more preferred range of carbon atoms in R— and RO— is from about 6 to about 16. The various R—'s and RO—'s in given mixtures can have the same or different alkyl groups. Preferred compositions are mixtures in the foregoing ranges particularly those in which the individual R—'s and RO—'s contain predominantly even numbers of carbon atoms.

Typical R—'s are hexyl, octyl, decyl, dodecyl, tetradecyl and hexadecyl. Typical RO—'s are corresponding "oxy" compounds, such as dodecoxy.

The time of catalyzed oxidation is for the most part a dependent variable. As a practical matter, the oxidation is continued until it appears that the reaction is complete as manifest by an oxygen content in the off-gas which is substantially the same as that in the oxidant supplied. The preferred oxidant is air. In some instances, the air is diluted with an inert such as nitrogen or recycle oxidant to assist in the avoidance of explosive mixtures. The oxidants are thus specified as oxygen and oxygen containing materials, preferred materials being air.

The pressures are not particularly critical. Pressures from about ½ to about 25 atmospheres are useful with about 1 to about 5 atmospheres preferred. Typical pressures are 1, 2 or 3 atmospheres and 45 p.s.i.g.

The present oxidation catalysts provide unavoidable halogen and metal contamination of product alkoxides. The contaminants generally find their way to aqueous phases when the alkoxides are utilized as, for example, in hydrolysis to produce alcohols. Thus in the typical hydrolysis with aqueous sulfuric acid, the by-product alum is contaminated with metal and halogen. Thus the present process is performed where such contamination of by-products is not objectionable or where the by-product value is minor in comparison to the oxidation improvement realized through the catalysis so that the by-product is advantageously merely discarded. Such is a characteristic of the present catalysis which is so beneficial as to make it practical in many instances to discard the by-product or accept a non-premium value for it.

The contamination of alum which results from titanium presence therein usually is less serious than the halogen contamination and even can be beneficial. Even so, the lowering of the titanium contamination is not impractical. As an example, after sulfuric acid hydrolysis of the alkoxides, the alcohol is separated from the aluminum sulfate contaminated with titanium sulfate and the sulfate mixture is then hydrolyzed at a pH of about 2–3 for 2 to 4 hours at about 95° C. whereby the titanium sulfate is converted to a separate phase of titanium dioxide which is removable by filtration and settling. This purification is enhanced by seeding with 1–10 weight percent of titanium dioxide particles. In this way it is possible to lower the titanium contamination of alum from a typical 200 parts per million to about 10 parts per million which is quite low.

An intermediate catalyst with respect to halogen contamination is one or more of several mixed halogenalkoxide species of the Group IV–B metals. An example of such is trihexoxy titanium chloride. Another example is diisopropoxy titanium dichloride. Other examples are other alkoxides of bromine or iodine. These materials are inexpensive to produce and easy to handle and use. In producing such materials, the fully halogenated material, such as titanium tetrachloride, is reacted with the corresponding alcohol such as isopropanol or dodecanol-1 or hexadecanol-1 to produce the dialkoxy-dihalo titanates or the trialkoxy mono halo titanates, which are useful catalysts. The production of such materials, even the trialkoxy mono halo titanates, is described in U.S. application S.N. 603,141, filed Dec. 20, 1966, in the name of Charles E. Marble, now abandoned, the parent of U.S. Pat. 3,547,966.

In general, these intermediates are used in the same manner and same concentration with respect to proportions of aluminum and titanium in the systems as with $TiCl_4$ materials.

One surprising aspect of the present invention is that titanium tetrachloride is well known as a component of many catalyst systems used in the polymerization of olefins. Since a preferred method of producing aluminum alkyls leaves olefins co-present in large quantities, which are carried into oxidation, it was believed by many that the combination of aluminum alkyls, olefins and titanium tetrachloride would result in unacceptable losses of olefins through polymerization. It has been discovered that, although this may produce problems and losses in other systems, this does not appear to offer any problem in the present systems.

Data presented herein actually indicate reduced losses to polymerizations.

The data selected for presentation herein show that even small proportions of catalyst have appreciable effect with particularly dramatic improvements in the yield and reductions in the losses to heavy ends in the region of 0.5 to 10.0 percent titanium by weight in catalyst added based on the amount of aluminum present in alkyl- or alkoxy alkyl-aluminum compounds. Useful catalyst ranges on the foregoing basis are from about 0.1 to about 3.0 percent with a narrower range up to about 1.0 percent preferred. A particularly useful percentage is 1.05 or about 1.0 percent.

The preferred process has been mentioned previously as involving a two phase procedure in the catalyzed operation which follows a preliminary oxidation preferably conducted without catalyst. In a particularly preferred arrangement, off-gas from a preliminary oxidation, which is almost pure nitrogen, is collected and used as a diluent for air in the second phase of the catalyzed operation to insure against the presence of explosive mixtures.

Thus, the preliminary oxidation is typically conducted in a prior art manner for aluminum trialkyls using air, a temperature of −20 to +150° C. with about 35 to about 85° C. preferred, a pressure of about 1 to about 10 atmospheres. This preliminary oxidation is typically conducted to a level of about 30 to 70 percent of the alkyl groups converted to alkoxy groups.

The two phases for the second oxidation are frequently conducted under similar conditions as herein described in greater detail. The important difference between the two phases is concentration of oxygen in the oxident. As a practical matter, the first pase of the second oxidation, using ordinary air, is conducted until the oxidation rate becomes to slow that the oxygen content in the off-gas rises toward explosive proportions, typically about 8–10 percent oxygen by volume. When this condition is attained, diluent, preferably nitrogen off-gas from the preliminary oxidation is added to the air used. The addition ratio is not particularly critical. In some instances the complexity of programmed proportioning to maintain an 8–10 percent oxygen content in the off-gas from the second oxidation is desired. For the most part, however, the simple expedient of diluting the air with a substantially uniform diluent ratio of two parts by volume of nitrogen per part of air is preferred.

nitrogen at about 9 p.s.i.g. A weighed amount of feed is charged to the system, 31 pounds being typical, about ⅓ being a suitable diluent such as octene-1. The feed is either trialkyl aluminum material or a mixture of alkoxy alkyl aluminum material. The agitator is set in motion typically at 1450 r.p.m. For the present catalysis starting from trialkyl aluminum feed, one conducts a first oxidation along uniform lines, charges the catalyst, then proceeds in catalytic operation to investigate numerous variables in the later operation.

For a typical first oxidation with a statistical mixture of alkyls ranging from about ethyl to about eicosyl, predominantly about dodecyl, air is fed at the rate of 60 standard cubic feet per minute and pressure is adjusted to 40 p.s.i.g. The temperature is held at 47° C. The oxygen content of the off-gas is very low for approximately 58 minutes producing a conversion of about 58 percent of the alkyl groups to alkoxy groups.

At this point the physical conditions are adjusted to the values specified on the attached tabulations for Examples 1–17. The catalyst is charged and oxidation is continued until the oxygen content of the off-gas increases to approximately 10 percent. At this time the preferred oxidant is changed to a mixture of air and diluent to avoid explosive mixtures in the oxidizer. A preferred dilaent is nitrogen taken from the off-gas of the first oxidation. This off-gas is almost pure nitrogen. Typically, the air feed rate is 10 s.c.f.m. and the nitrogen feed rate is 20 s.c.f.m. providing an oxygen content of about 8.0 percent. The oxidant feed and the off-gas are analyzed. The soak phase of the second oxidation is continued until the oxygen content of the off-gas is substantially the same as that of the oxidant fed.

| Quantity | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Temperature (oxid.), °C | 55 | 35 | 42 | 55 | 55 | 67 | 67 | 55 | 55 | 55 | 55 | 55 | 55 | 32 | 75 | 47 | 85 |
| Temperature (soak), °C | 77 | 77 | 77 | 77 | 77 | 67 | 67 | 77 | 77 | 77 | 77 | 77 | 77 | 77 | 77 | 67 | 77 |
| Air rate, s.c.f.m | 60 | 60 | 90 | 60 | 90 | 60 | 60 | 60 | 60 | 60 | 60 | 60 | 120 | 25 | 25 | 120 | 60 |
| Cat. conc., wt. percent | 2.0 | 1.05 | 1.05 | 3.0 | 1.05 | 1.05 | 0 | 0 | 0.2 | 0.4 | 0.6 | 1.2 | 1.05 | 1.05 | 1.05 | 1.05 | 1.05 |
| Agitation, r.p.m | 1,450 | 1,525 | 1,375 | 1,425 | 1,350 | 1,300 | 1,250 | 1,425 | 1,450 | 1,540 | 1,425 | 1,350 | 1,425 | 1,400 | 1,450 | 1,200 | 1,450 |
| Time (oxid.), min | 25 | 30 | 19 | 25 | 16 | 25 | | 40 | 41 | 41 | 41 | 30 | 13 | 70 | 70 | 12 | 30 |
| Time (soak), hrs | 6.12 | 5.47 | 5.75 | 6.83 | 6.33 | 4.25 | 3.53 | 3.0 | 3.50 | 3.53 | 3.57 | 5.25 | 5.62 | 4.90 | 4.58 | 6.25 | 5.42 |
| Feed, percent oxid | 56.8 | 57.1 | 58.8 | 56.4 | 58.4 | 63.3 | 62.7 | 58.9 | 58.3 | 58.9 | 57.9 | 57.1 | 56.2 | 57.2 | 57.8 | 58.3 | 59.0 |
| Prod., percent oxid | 93.7 | 93.7 | 93.9 | 94.2 | 93.3 | 92.5 | 82.1 | 82.5 | 86.5 | 89.0 | 90.9 | 92.5 | 91.8 | 93.2 | 92.7 | 93.4 | 92.9 |
| Heavies in feed | 4.1 | 4.4 | 4.1 | 4.1 | 4.8 | 4.8 | 4.8 | 4.1 | 4.1 | 4.1 | 4.1 | 4.1 | 4.8 | 4.1 | 4.8 | 4.4 | 4.8 |
| Heavies in prod | 5.3 | 6.5 | 5.6 | 5.2 | 6.4 | 7.5 | 19.3 | 22.1 | 17.0 | 15.6 | 10.6 | 6.6 | 6.6 | 6.7 | 7.1 | 5.5 | 9.2 |

The second phase of the second oxidation is conducted until substantial termination of oxidation is attained as evidenced by substantially the same percentage of oxygen in the off-gas as in the oxidant fed.

The oxidant feed rate is not particularly critical; however, an economic balance can be determined for large scale operation relating pumping costs, reactor time costs and the like. In general, the oxidation rate increases as oxidant flow increases as shown in the data. Several conditions selected include:

(1) Same oxygen flow rate in the two phases.
(2) Same total gas volume flow rate in the two phases.
(3) Approximately one-half the total gas volume flow rate in the second phase as in the first phase.

Although the data reflect a uniform flow rate of about 30 s.c.f.m. for the second phase, the various rates given for the first phase show different total volume relative ratios for the two phases.

Experimental

Tests were made in a 5-gallon, jacketed, stainless steel autoclave provided with twin turbine agitators arranged one above the other on a shaft with rotational speed controllable over a range of about 750–2000 r.p.m.

Oxidant material, preferably air or diluted air, is admitted to the system through a perforated distributor pipe with openings located directly below (approximately one inch) the lower agitator.

At the start of a run, the system is pressurized with

In the foregoing tabulation, catalyst concentration is based on the relationship of the aluminum and titanium in the various species. A typical catalyst proportion of 1 percent means that the weight of the titanium constituency in the catalyst is 1 percent of the weight of the aluminum in the alkyl-alkoxide compounds present.

The percent of oxidation of the feed and product are determined on a basis of alcohol recovered after hydrolysis of the respective material. The "feed" is obtained from a "first" oxidation.

The heavies are expressed as wt. percent of molecules having twenty or more carbon atoms. The increase during oxidation is generally attributable to dimerization, polymerization or esterification.

Oxidation time is that for the first phase of a "second" oxidation where air is fed as oxidant.

Soak time is that for the second phase of a "second" oxidation where air-nitrogen in a 1:2 volume ratio is fed as oxidant.

EXAMPLE 18

The foregoing examples are repeated using the following catalyst materials. Similar desirable results are obtained.

Zirconium chloride, hafnium chloride, titanium bromide, zirconium iodide, diisopropoxytitanium dichloride, trioctoxy titanium chloride, ethoxytitanium trichloride, tridodecoxy titanium bromide.

We claim:

1. In a process for producing trialkoxy aluminum compounds by oxidizing alkyl aluminum alkoxide compounds with materials selected from the group consisting of oxygen and oxygen-containing materials under conditions conducive to the conversion of alkyl aluminum compounds to alkoxy aluminum compounds, the improvement which comprises charging a Group IV–B metal chloride, bromide, or iodide catalyst to the reaction system at a stage of the reaction at which alkoxide groups constitute from about 30 percent to about 70 percent of the total of alkyl groups and alkoxide groups on aluminum, the amount of said catalyst added being such that the metal constituent thereof is from about 0.1 to about 10.0 weight percent of the aluminum present.

2. In the process for oxidizing aluminum alkyls to produce aluminum trialkoxides wherein alkyl aluminum alkoxide compounds are converted to trialkoxy aluminum compounds by reaction with materials selected from the group consisting of oxygen and oxygen-containing materials under conditions conducive to the conversion of aluminum alkyls to aluminum alkoxides, the improvement which comprises combining titanium tetrachloride catalyst with the reaction mass at a stage of the reaction at which alkoxide groups constitute from about 30 percent to about 70 percent of the total of alkyl groups and alkoxide groups on aluminum, the catalyst being used in an amount wherein the titanium content thereof is about 0.65 percent by weight based on the aluminum content of the alkyl or alkoxy-alkyl aluminum compounds, the oxidation being conducted at a temperature of about 55° C.

3. The process of claim 1 wherein the oxidation occurs in a plurality of process steps and the charging operation occurs at an intermediate step.

4. The process of claim 1 wherein the materials are reacted in a first process step to an aluminum alkoxide content of from about 30 to about 60 percent of the organic aluminum groups present and in a second process step to substantial completion of oxidative conversion of alkyl groups to alkoxide groups, the charging step occurring between the first and second process steps.

5. The process of claim 1 wherein the metal constituency of the catalyst charged is titanium.

6. The process of claim 1 wherein the metal consistuency of the catalyst charged to the system is essentially titanium and the halogen constituency is essentially chlorine.

7. The process of claim 1 wherein the catalyst is titanium tetrachloride.

8. The process of claim 1 wherein the metal constituency percentage, same basis, is from about 0.1 to about 3.0.

9. The process of claim 1 wherein the metal constituency percentage, same basis, is from about 0.1 to about 1.0.

10. The process of claim 1 wherein the metal constituency percentage, same basis, is about 1.05 and the reaction temperature is from about 35° C. to about 85° C.

11. The process of claim 1 wherein the oxygen and oxygen-containing material used in the catalyzed operation is initially air and subsequently is air diluted with nitrogen as the oxidation proceeds toward completion whereby the maximum concentration of oxygen in the off-gas on a volume basis is from about 8 to about 10 percent.

12. The process of claim 1 performed at a temperature of from about 35° C. to about 85° C. using air as the oxygen-containing material.

References Cited
UNITED STATES PATENTS

| | | | |
|---|---|---|---|
| 3,262,957 | 7/1966 | Roha et al. | 260—448 AD |
| 3,100,231 | 8/1963 | Roha et al. | 260—448 D X |
| 3,322,806 | 5/1967 | Asinger et al. | 260—448 A |
| 3,475,477 | 10/1969 | Muller et al. | 260—448 AD |

TOBIAS E. LEVOW, Primary Examiner

H. M. S. SNEED, Assistant Examiner